United States Patent
Fan et al.

(10) Patent No.: US 11,881,023 B2
(45) Date of Patent: Jan. 23, 2024

(54) METHOD AND SYSTEM FOR GENERATING VIDEO

(71) Applicant: SAMSUNG ELECTRONICS CO., LTD., Suwon-si (KR)

(72) Inventors: Jiankang Fan, Nanjing (CN); Biao Wang, Nanjing (CN); Chunhua Liu, Nanjing (CN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 258 days.

(21) Appl. No.: 17/018,464

(22) Filed: Sep. 11, 2020

(65) Prior Publication Data

US 2021/0097288 A1  Apr. 1, 2021

(30) Foreign Application Priority Data

Sep. 26, 2019  (CN) .......................... 201910916151.4

(51) Int. Cl.
*G06F 16/783* (2019.01)
*G06F 16/71* (2019.01)
*G06V 20/40* (2022.01)

(52) U.S. Cl.
CPC .............. *G06V 20/41* (2022.01); *G06F 16/71* (2019.01); *G06F 16/7844* (2019.01); *G06V 20/46* (2022.01)

(58) Field of Classification Search
CPC ............................ G06F 16/71; G06F 16/7844
See application file for complete search history.

(56) References Cited

U.S. PATENT DOCUMENTS

| | | | |
|---|---|---|---|
| 8,566,315 B1 * | 10/2013 | Davtchev | G06F 16/78 707/736 |
| 2007/0168259 A1 | 7/2007 | Haberman et al. | |
| 2007/0225996 A1 | 9/2007 | Haberman et al. | |

(Continued)

FOREIGN PATENT DOCUMENTS

| | | |
|---|---|---|
| CN | 108509465 A | 9/2018 |
| CN | 110121116 A | 8/2019 |

(Continued)

OTHER PUBLICATIONS

International Search Report (PCT/ISA/210) dated Dec. 30, 2020 by the International Searching Authority in International Application No. PCT/KR2020/012391.

(Continued)

*Primary Examiner* — Richard L Bowen
(74) *Attorney, Agent, or Firm* — Sughrue Mion, PLLC

(57) ABSTRACT

A method and an apparatus for generating a video are provided. The method may include performing, by a server, semantic analysis on an original video according to a timing characteristic of the original video, and segmenting the original video to obtain video segments with semantic information; obtaining, by the server, a video generation sequence model with a timing characteristic based on at least one previously configured video generation sequence model with a timing characteristic according to preference video information obtained from a client; and reorganizing, by the server, the video segments with the semantic information according to the video generation sequence model with the timing characteristic to obtain a target video of the client.

20 Claims, 4 Drawing Sheets

(56) References Cited

U.S. PATENT DOCUMENTS

| | | | |
|---|---|---|---|
| 2012/0303617 A1* | 11/2012 | Elliot | G06F 16/951 707/736 |
| 2013/0343729 A1* | 12/2013 | Rav-Acha | H04N 9/87 386/285 |
| 2015/0153906 A1* | 6/2015 | Liao | G06F 16/7844 715/709 |
| 2016/0049173 A1* | 2/2016 | Anderson | G11B 27/031 386/241 |
| 2016/0070962 A1* | 3/2016 | Shetty | G06V 20/46 382/225 |
| 2016/0335499 A1 | 11/2016 | Tsai et al. | |
| 2018/0203855 A1 | 7/2018 | Han et al. | |
| 2018/0247126 A1* | 8/2018 | Li | G06V 10/50 |
| 2018/0249193 A1 | 8/2018 | Zhang et al. | |
| 2018/0352091 A1* | 12/2018 | Puri | H04M 7/0036 |
| 2019/0075309 A1 | 3/2019 | Wang et al. | |
| 2020/0090701 A1* | 3/2020 | Xu | G11B 27/031 |

FOREIGN PATENT DOCUMENTS

| | | |
|---|---|---|
| JP | 2011-175349 A | 9/2011 |
| JP | 5908435 B2 | 4/2016 |
| KR | 10-2016-0034971 A | 3/2016 |
| KR | 10-2017-0095039 A | 8/2017 |

OTHER PUBLICATIONS

Communication dated Jun. 2, 2022 issued by the Chinese Patent Office in CN Application No. 201910916151.4.

* cited by examiner

METHOD AND SYSTEM FOR GENERATING VIDEO

CROSS-REFERENCE TO THE RELATED APPLICATION

This application is based on and claims priority from Chinese Patent Application No. 201910916151.4 filed on Sep. 26, 2019, the disclosure of which is incorporated herein in its entirety by reference

BACKGROUND

1. Field

Methods and apparatuses consistent with example embodiments of the inventive concept relate to video generation.

2. Description of the Related Art

Currently, when an original video is acquired, the original video is processed to extract video information, and a video of interest is generated. When processing the original video, a video tag may be extracted or video redundancy may be removed to get a video clip of interest.

However, when the original video is processed to generate the video through the above method, the original video is processed by simple means such as extracting the video tag or removing the video redundancy. There is not a method for uniformly segmenting and reorganizing the original video. As such, the video may not be automatically generated according to a user's wish.

SUMMARY

Example embodiments of the inventive concept provide a method for generating a video. The method may automatically generate a video according to a user's wish.

The embodiments also provides a system for generating a video. The system may automatically generate a video according to a user's wish.

According to the embodiments. there is provided a method for generating a video which may include: performing, by a server, semantic analysis on an original video according to a timing characteristic of the original video, and segmenting the original video to obtain video segments with semantic information; obtaining, by the server, a video generation sequence model with a timing characteristic based on at least one previously configured video generation sequence model with a timing characteristic according to preference video information obtained from a client; and reorganizing, by the server, the video segments with the semantic information according to the video generation sequence model with the timing characteristic to obtain a target video of the client.

The performing the semantic analysis may include performing the semantic analysis on the original video through at least one of a video capture mode, a voice recognition mode, and an image recognition mode.

The above method may further include performing a smoothing process on the reorganized video segments, so that the reorganized video segments are normalized, before the target video is obtained.

The method may further include updating, in real time, the previously configured video generation sequence model with the timing characteristic according to user evaluation information acquired from the client.

The client may be a user terminal. The application may be configured at the user terminal The preference video information may be obtained from the client through a collecting device adopted by the application.

According to the embodiments, there is provided an apparatus for generating a video which may include: an original video analyzing and segmenting module configured to perform semantic analysis on an original video according to a timing characteristic of the obtained original video, and segment the original video to obtain video segments with semantic information; a model generating module configured to configure at least one video generation sequence model with a timing characteristic; and a target video generating module configured to obtain a video generation sequence model with a timing characteristic based on the configured video generation sequence model with the timing characteristic according to preference video information obtained from a client, reorganize the video segments with the semantic information according to the video generation sequence model with the timing characteristic to obtain a target video of the client.

The apparatus may further include a storing module configured to store the video segments with the semantic information.

The processor may be further configured to implement a video normalization processing module, configured to perform a smoothing process on the reorganized video segments, so that the reorganized video segments are normalized.

The processor may be further configured to implement a user evaluating module configured to receive user evaluation information, and update, in real time, the configured video generation sequence model with the timing characteristic according to the user evaluation information.

According to the embodiments, there is provided an apparatus for generating a video. The apparatus may include at least one processor configured to implement: an original video analyzing and segmenting module configured to obtain and analyze first information about a subject matter of a target video, search for at least one original video in a network by performing semantic analysis based on the first information, and extract a plurality video segments corresponding to the first information from the original video; a model generating module configured to configure a plurality of video generation sequence models with respective timing characteristics; and a target video generating module configured to obtain a selected video generation sequence model corresponding to the first information from among the video generation sequence models, and reorganize the video segments based on the selected video generation sequence model to obtain the target video.

DETAILED DESCRIPTION

Reference will now be made in detail to embodiments which are illustrated in the accompanying drawings. In this regard, the present embodiments are all example embodiment, and thus, may have different forms and should not be construed as being limited to the descriptions set forth herein.

In order to automatically generate a video according to a user's wish, an embodiment reorganizes video segments for an original video with a timing characteristic based on an artificial intelligence (AI) method, combines a current actual situation of a client with a target video that a user wants to achieve, to obtain a final target video. Specifically, a server performs a semantic analysis on the original video according to the timing characteristic of the original video, and segments the original video to obtain video segments with semantic information; obtains a corresponding video generation sequence model with a timing characteristic through matching with a configured video generation sequence model with a timing characteristic according to preference video information obtained from the client; reorganizes the video segments with the semantic information according to the corresponding video generation sequence model with the timing characteristic obtained through matching to obtain the target video of the client. In this way, the embodiment may enable to automatically generate a video according to a user's wish.

Figure 1:
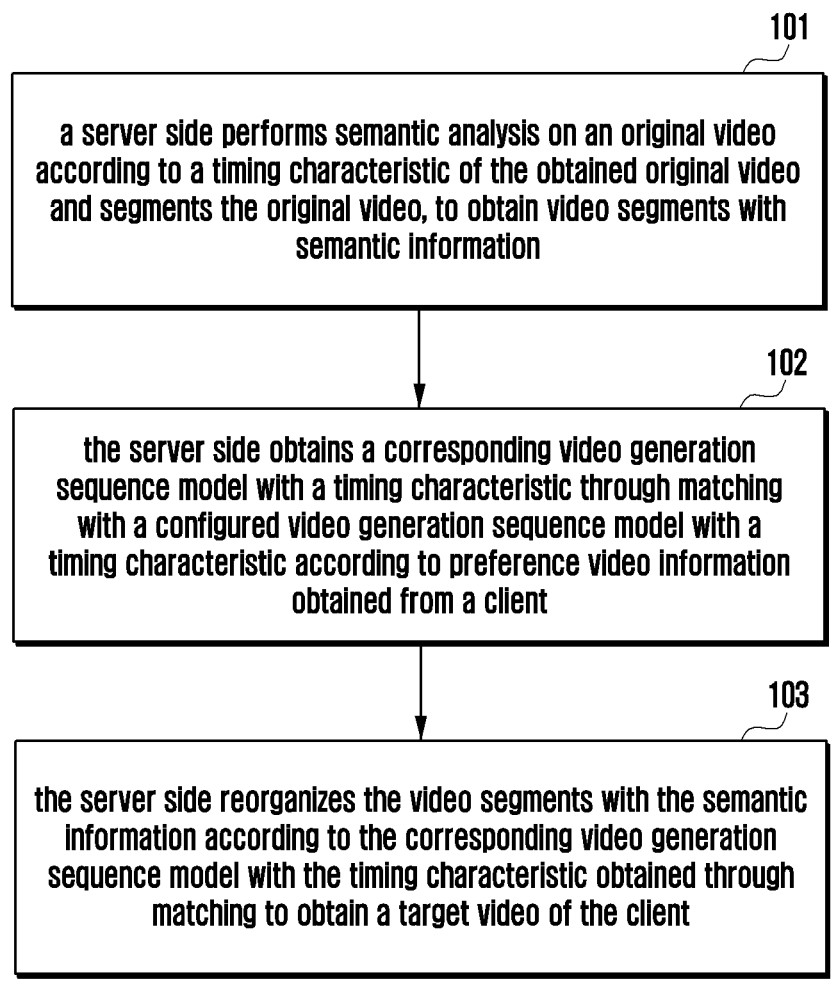
FIG. 1 is a flowchart illustrating a method for generating a video according to an embodiment.

FIG. 1 is a flowchart illustrating a method for generating a video according to an embodiment, which includes the following steps.

At step 101, a server side performs semantic analysis on an original video according to a timing characteristic of the original video, and segments the original video to obtain video segments with semantic information.

At step 102, the server obtains a corresponding video generation sequence model with a timing characteristic through matching with a configured video generation sequence model with a timing characteristic according to preference video information obtained from a client.

At step 103, the server reorganizes the video segments with the semantic information according to the corresponding video generation sequence model with the timing characteristic obtained through the matching, thereby to obtain a target video of the client.

In the above method, the semantic analysis may be performed on the original video through an AI technology such as a video capture mode, voice and image recognition, etc.

In the above method, the client may be implemented by a user terminal such as an intelligent terminal, not being limited thereto. The intelligent terminal is used as a terminal device for collecting various information about a user. After an application supporting the above method is installed thereon, the intelligent terminal collects preference video information of the user through a collecting device such as a camera or a microphone, and receives the target video of the client sent by the server for display. The collecting device may be included in the client as its component.

The above method may further include, before obtaining the target video of the client, performing a smoothing process on the reorganized video segments so that the reorganized video segments are normalized and the target video of the client becomes smoother.

The method may also further include updating and improving, in real time, the configured video generation sequence model with the timing characteristic according to user evaluation information acquired from the client.

Figure 2:
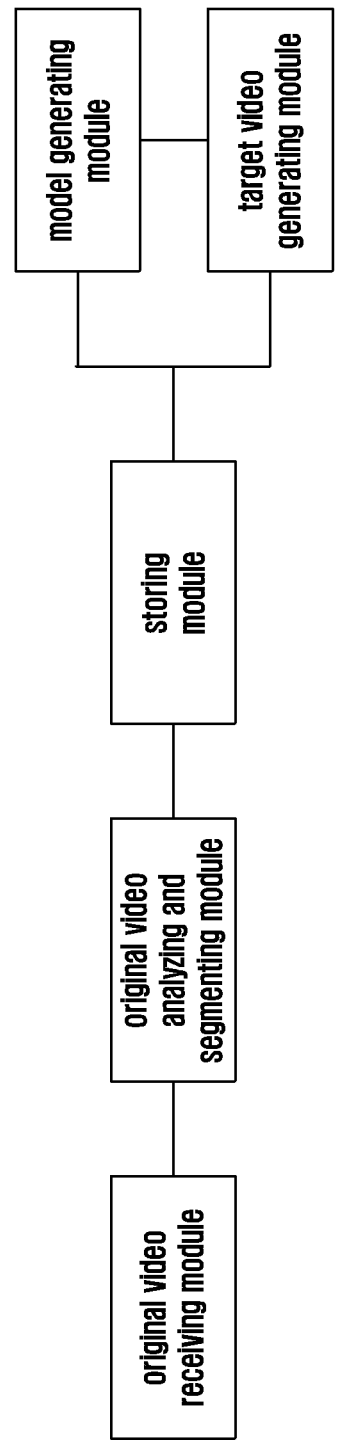
FIG. 2 is a schematic diagram illustrating an apparatus at a server according to an embodiment.

FIG. 2 is a schematic diagram illustrating a video generating apparatus included in a server according to an embodiment. According to an embodiment, the video generating apparatus may include an original video receiving module, an original video analyzing and segmenting module, a model generating module, and a target video generating module.

The original video receiving module receives an original video with a timing characteristic. The original video receiving module may include a communication interface such as one or a combination of a digital modem, a radio frequency (RF) modem, a WiFi chip, and related software and/or firmware, not being limited thereto.

The original video analyzing and segmenting module performs a semantic analysis on the original video according to the timing characteristic of the original video, and segments the original video, thereby to obtain video segments with semantic information.

The model generating module configures a video generation sequence model with a timing characteristic.

The target video generating module obtains a video generation sequence model with a timing characteristic corresponding to the original video through matching with the configured video generation sequence model with the timing characteristic according to preference video information obtained from a client, and reorganizes the video segments with the semantic information according to the corresponding video generation sequence model with the timing characteristic obtained through the matching, thereby to obtain a target video of a client.

The apparatus further includes a storing module that stores the video segments with the semantic information. The storing module may include at least one memory such as a volatile memory and/or a non-volatile memory, not being limited thereto.

The apparatus further includes a video normalization processing module that performs a smoothing process on the reorganized video segments so that the reorganized video segments can be normalized and the obtained target video of the client can become smoother.

The apparatus further includes a user evaluating module that receives user evaluation information, and updates and improves, in real time, the video generation sequence model with the timing characteristic according to the user evaluation information.

According to embodiments, at least one of the modules described above to constitute the video generating apparatus may be embodied as various numbers of hardware, software and/or firmware structures that execute respective functions described above. For example, at least one of these modules may use a direct circuit structure, such as a memory, a processor, a logic circuit, a look-up table, etc. that may execute the respective functions described above through controls of one or more microprocessors or other control apparatuses. Also, at least one of these modules may be specifically embodied by a program or a part of code, which contains one or more executable instructions for performing specified logic functions, and executed by one or more microprocessors or other control apparatuses. Further, at least one of these modules may include or may be implemented by a processor such as a central processing unit (CPU) that performs the respective functions, a microprocessor, or the like. Two or more of these modules may be combined into one single module which performs all operations or functions of the combined two or more modules. Also, at least part of functions of at least one of these modules may be performed by another of these modules. Further, although a bus is not illustrated in the above block diagrams, communication between the modules may be performed through the bus. Functional aspects of the above embodiments may be implemented in algorithms that execute on one or more processors. Furthermore, these modules may employ any number of related art techniques for electronics configuration, signal processing and/or control, data processing and the like.

Figure 3:
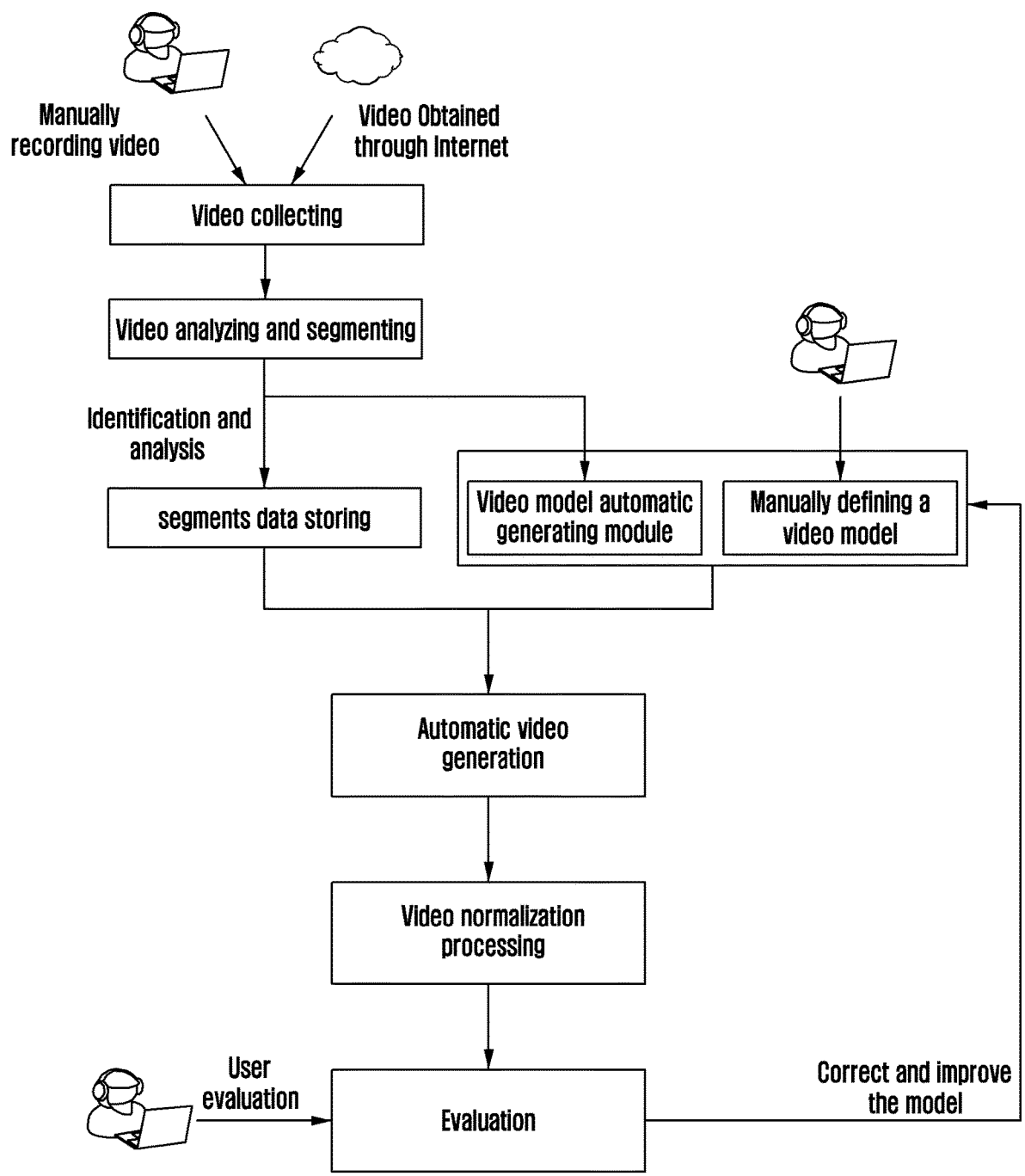
FIG. 3 is a schematic diagram illustrating a process for generating a video according to an embodiment.

FIG. 3 is a schematic diagram illustrating a process of generating a video according to an embodiment.

The process of generating a video according to an embodiment is described below in reference to FIG. 2. The original video with the timing characteristic obtained by the original video receiving module may be manually imported. The original video may be a video which can be intelligently searched for from a video website in a network, such as the Internet, according to a video-related tag, and downloaded and imported. The original video may not be received and stored at the original video receiving module, and instead, may be directly transmitted to the original video analyzing and segmenting module for analysis.

The original video analyzing and segmenting module obtains a text sequence corresponding to the original video and performs semantic analysis on the text sequence through capturing a video, recognizing a voice, recognizing a video, etc. using an AI technology, segments the original video according to semantic activity information, deduplicates and removes one or more video segments unrelated to the semantic activity, and obtains one or more video segments with the semantic information. Here, the text sequence may have been received at the original video receiving module along with the original video before it is obtained by the original video analyzing and segmenting module for the semantic analysis and segmenting.

The storing module stores the video segments with the semantic information, and indexes the video segments according to the semantic activity information so that the target video generating module may quickly locate one or more video segments corresponding to different semantic activity information.

The model generating module may adopt two methods when generating the video generation sequence model with the timing characteristic. A first method includes automatically generating and storing the video generation sequence model with the timing characteristic or a timing relationship according to the semantic analysis by the original video analyzing and segmenting module. In a second method, a video generation sequence model with a timing characteristic is configured in advance to include information about a category of a model (such as a makeup category, a cooking category, a haircut category, etc.), a step of the model, and a weight corresponding to each step, etc. In this way, the configured video generation sequence model is classified according to different demand activities, which makes it easy to quickly and accurately locate, in the video generating process, a video generation sequence model that meets requirements. The model generating module may configure a plurality of video generation sequence models with timing characteristics in advance.

The target video generating module selects a suitable video generation sequence model from among the configured video generation sequence models, according to the preference video information acquired from the client. After selecting the suitable video generation sequence model, the target video generating module obtains and reorganizes corresponding video segment information from the video segments using related techniques such as deep learning, and thus, generates one or more candidate videos that meet the requirements. The target video generating module applies a weight value to each of the candidate videos at least according to a matching degree, and then transmits the candidate videos to an application at the client in the form of a list according to an order of the weight values so that a user may select one of the candidate videos as a target video. Alternatively, the target video generating module may select a target video from among the candidate videos based on the order of the weight values.

The video normalization processing module normalizes the target video. Videos and voices related to the videos may not be unified or consistent in a new video generated by reorganizing different original video segments, so that the video normalization processing module performs video and voice normalization on the reorganized video. An AI image recognition technology may be used to analyze the reorganized video and eliminate a difference, so as to achieve smooth transition among multiple video segments. The voice recognition technology is used to convert multiple voice segments into a unified text format. Finally, a Text To Speech (TTS) technology may be used to convert the text into a unified or consistent voice.

The user evaluating module adopts the target video, and performs an operating activity on the target video. The user may score or evaluate the target video according to a final result, and return user evaluation information to the server to realize self-deep learning of the video generation sequence model to achieve continuous correction and improving.

The above embodiments will be described with two specific examples.

According to a first example, generating a makeup video which is an activity event with a timing characteristic is presented. In this example, a user interface in a client is built based on the Android application system layer framework, and a server is implemented by Java Web architecture, an image recognition Python library, and Xunfei voice recognition. An artificial intelligence technology employed during implementation is not limited to this example, and may be used in any user interface.

Figure 4:
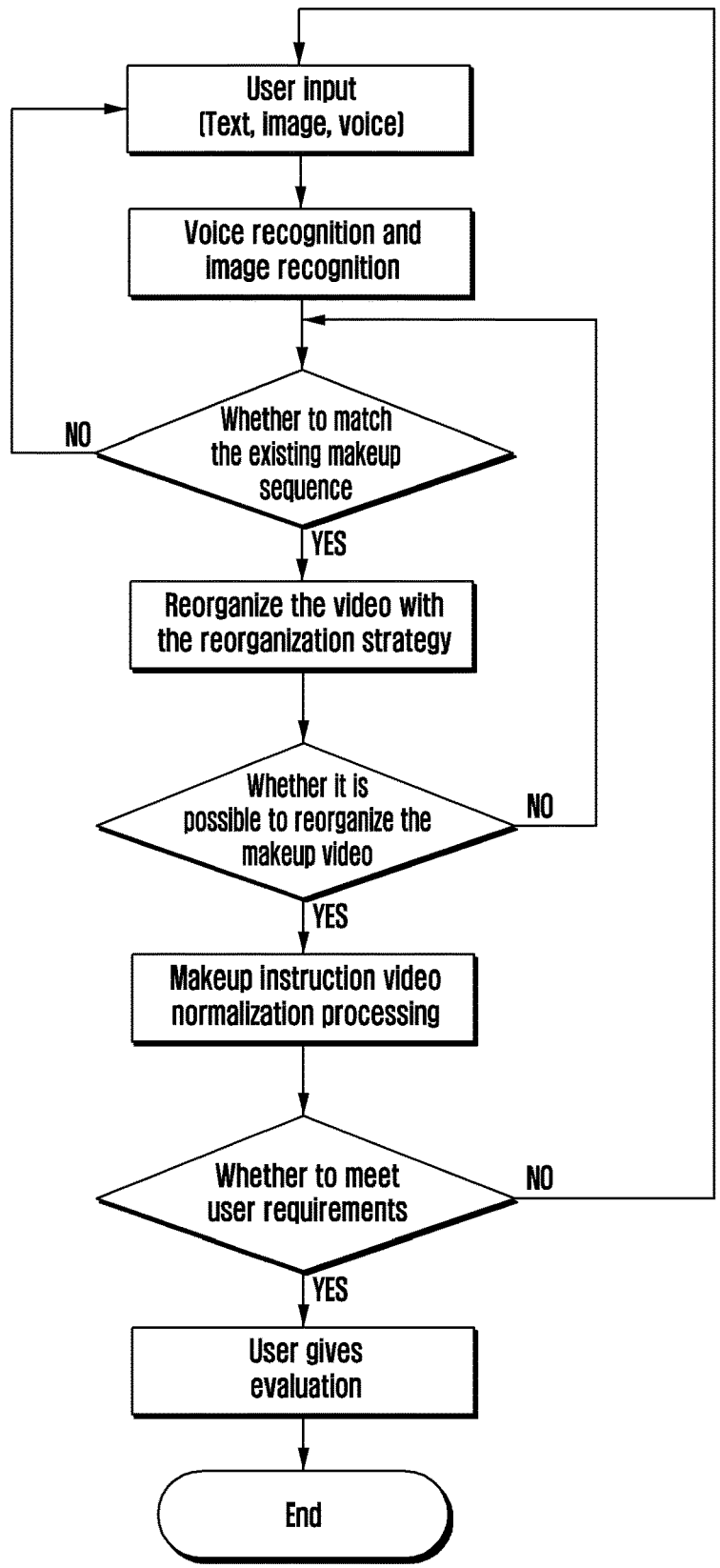
FIG. 4 is a flowchart illustrating an implementation of a first example according to an embodiment.

A specific process of the first example will be described in detail with reference to FIG. 4.

At a first step, an application of a client provides a user makeup information input interface. The interface may enable to input makeup information about a makeup type, cosmetics, makeup tools, face contour, skin color, etc., using a text, a voice and/or an image. After a user inputs the makeup information through the application of the client, the makeup information input by the user is transmitted to the server through a network, and this makeup information may be used as preference video information of the user.

At a second step, an analysis and recognition of an image, a voice and/or a text may be performed according to the makeup information input by the user to obtain information such as a makeup type, cosmetics and/or makeup tools, and a makeup video generation sequence model of a makeup activity category, which may have been previously configured and stored at a server, is matched in the server according to the makeup information input by the user at the client. After the matching is successful, a next step is performed.

At a third step, after matching a suitable timing model, video segments corresponding to the makeup information are searched for from video segments available at the server according to the timing model, and the corresponding video segments are reorganized to generate a makeup video.

At a fourth step, if the reorganization of the video fails, the timing model of the makeup video is switched, and the video reorganization is reperformed. If, however, the reorganization of the video is successful, a next step is performed.

At a fifth step, at a normalization processing stage of the video, an AI image recognition technology is mainly used to analyze the reorganized video and eliminate a difference, so as to achieve smooth transition among multiple video segments. A voice recognition technology may be used to convert multiple voice segments into a unified text format. Finally, the TTS technology is used to convert the text into a unified voice.

At a sixth step, after the generated makeup video is transmitted to the client, the client determines whether the video meets requirements of the user through a browsing result. If the video does not meet the requirements of the user, the user may be prompted to enter other necessary relevant information, and then the first step is proceeded for continues processing. If the video meets the requirements of the user, the user may complete a makeup operation according to the makeup video.

At a seventh step, the user evaluates the makeup video based on a final makeup effect and submits an evaluation result.

According to a second example, generating a video for baking a soft cake which is an activity event with a timing characteristic is described. The specific process of this example is described as follows.

At a first step, a user activates an application installed on a mobile terminal device, such as a mobile phone or a tablet computer, and inputs information about a baking tool and/or baking materials that the user currently has, and other related information into the application. The application obtains information about the baking materials such as low-gluten flour, yeast, milk powder, salad oil, peanut oil, fine sugar, salt and eggs, etc., the baking tool such as an oven, chopsticks, an egg beater, a bowl, a mold, a measuring cup, mineral water, etc.

At a second step, a target video for a process of baking a soft bread is generated as follows.

Firstly, there is provide a first sub-process in which egg yolk and protein are separated. The egg yolk and the protein are separated through an egg separator in a usual video. However, the user does not currently have an egg separator, and there is a video segment available at the server that uses an eggshell or a mineral water bottle instead of the egg separator to separate the yolk and the protein. Such video segment is searched for and selected for the process of separating the egg yolk and the protein.

Secondly, there is provided a second sub-process in which the egg yolk and the protein are stirred. Since the user currently has the egg beater, a video segment with stirring through the egg beater is searched for and selected.

Thirdly, there is provided a third sub-process in which other materials are added for stirring. Butter is added for baking a cake in a usual video. However, the user does not currently have the butter, and instead, has the peanut oil, and thus the server may search for and select a video segment in which the peanut oil is used for stirring, instead of the butter.

Finally, there is provided a fourth sub-process in which the stirred egg yolk and protection are poured into a mold for baking. A video segment in which the oven is used for baking is directly selected.

At a third step, after generating the video segments in the second step, the video segments are reorganized according to a timing relationship. Normalization is performed to the reorganized video segments to generate a coherent new video possibly with voice. In this way, the user may completely experience the process of baking the soft cake through the client based on the existing materials and tools.

It can be seen that the above embodiments are directed to a solution for automatically generating a video with a timing characteristic, which allows a user to obtain a reorganized target video with a timing characteristic in accordance with a current operating environment. In this way, the user may fully complete an activity with the current operating environment by referring to the target video. The system may continuously correct the sequence model configured at the server according to feedback information of the user, so as to generate a more suitable target video.

It is noted that a plurality of steps described in the above embodiments may be implemented by an order different from the order described above, and one or more steps may be performed substantially at the same time.

The above embodiments are not used for limiting the inventive concept. Any modifications, equivalents, improvements, etc., made to the embodiments should be included in the scope of the.

What is claimed is:

1. A method for generating a video, the method comprising:
    performing, by a server, semantic analysis on an original video according to a timing characteristic of the original video, and segmenting the original video to obtain video segments with semantic information;
    obtaining, by the server, preference video information of a client;
    selecting, by the server, a video generation sequence model from a plurality of video generation sequence models, according to a content category of the preference video information, wherein the plurality of video generation sequence models are preconfigured and each of the plurality of video generation sequence models is configured to generate different types of video;
    obtaining, by the server, video segments corresponding to the preference video information, using the selected video generation sequence model corresponding to the content category of the preference video information; and
    reorganizing, by the server, the obtained video segments with the semantic information to obtain a target video of the client.

2. The method of claim 1, wherein the performing the semantic analysis comprises:
    performing the semantic analysis on the original video through at least one of a video capture mode, a voice recognition mode, and an image recognition mode.

3. The method of claim 1, further comprising:
    performing a smoothing process on the reorganized video segments by converting text in the reorganized video segments into a consistent voice level so that the reorganized video segments are normalized, before the target video is obtained.

4. The method of claim 1, further comprising:
    updating, in real time, the selected video generation sequence model with the timing characteristic according to user evaluation information acquired from the client.

5. The method of claim 1, wherein, when the reorganizing of the obtained video segments fails, reorganizing the obtained video segments using another timing model.

6. An apparatus for generating a video, the apparatus comprising at least one processor configured to:

perform semantic analysis on an original video according to a timing characteristic of the original video, segment the original video to obtain video segments with semantic information;

obtain preference video information of a client;

select a video generation sequence model from a plurality of video generation sequence models, according to a content category of the preference video information, wherein the plurality of video generation sequence models are preconfigured and each of the plurality of video generation sequence models is configured to generate different types of video;

obtain video segments corresponding to the preference video information, using the selected video generation sequence model corresponding to the content category of the preference video information; and reorganize the obtained video segments with the semantic information to obtain a target video of the client.

7. The apparatus of claim 6, wherein the at least one processor is further configured to receive the original video with the timing characteristic.

8. The apparatus of claim 7, wherein the original video is obtained from a network comprising the Internet.

9. The apparatus of claim 6, further comprising a communication interface configured to receive the original video with the timing characteristic via a network.

10. The apparatus of claim 6, further comprising:
a storage configured to store the video segments with the semantic information.

11. The apparatus of claim 10, wherein the storage is configured to index the video segments with the semantic information based on semantic activity information.

12. The apparatus of claim 6, wherein the at least one processor is further configured to perform a smoothing process on the reorganized video segments so that the reorganized video segments are normalized.

13. The apparatus of claim 6, wherein the at least one processor is further configured to receive user evaluation information, and update, in real time, the configured video generation sequence model with the timing characteristic according to the user evaluation information.

14. The apparatus of claim 6, wherein the at least one processor is configured to perform the semantic analysis on a text sequence corresponding to the original video.

15. The apparatus of claim 6, wherein the at least one processor is configured to when the reorganizing of the obtained video segments fails, reorganize the obtained video segments using another timing model.

16. An apparatus for generating a video, the apparatus comprising at least one processor configured to:

obtain and analyze first information about a subject matter of a target video, search for at least one original video in a network by performing semantic analysis based on the first information, extract video segments corresponding to the first information from the original video;

configure a plurality of video generation sequence models that are classified based on different demand activities, based on respective model information that includes a video content category of the video generation sequence model, operation steps of the video generation sequence model, and a weight corresponding to each of the operation steps;

obtain a selected video generation sequence model corresponding to the first information from among the video generation sequence models, based on a content category of user's preference video information, and the video content category included in each of the plurality of video generation sequence models;

perform a first video reorganization on the video segments based on a first timing model; and when the first video reorganization fails, perform a second video reorganization on the video segments based on a second timing model that is different from the first timing model to obtain the target video.

17. The apparatus of claim 16, wherein the at least one processor is configured to perform the semantic analysis on a text sequence corresponding to the original video.

18. The apparatus of claim 16, wherein the at least one processor is configured to extract the video segments from the original video according to second information about a semantic activity, and remove one or more video segments unrelated to the semantic activity from the original video, to extract the video segments with semantic information.

19. The apparatus of claim 16, wherein the at least one processor is further configured to perform a smoothing process on the video segments that are reorganized via the second video reorganization, by converting text in reorganized video segments into a consistent voice level so that the reorganized video segments are normalized.

20. The apparatus of claim 16, wherein the target video comprises the video segments that are reorganized in terms of time sequence.

* * * * *